(12) United States Patent
Zheng

(10) Patent No.: US 12,387,356 B2
(45) Date of Patent: Aug. 12, 2025

(54) BINOCULAR VISION-BASED ENVIRONMENT SENSING METHOD AND APPARATUS, AND UNMANNED AERIAL VEHICLE

(71) Applicant: AUTEL ROBOTICS CO., LTD., Guangdong (CN)

(72) Inventor: Xin Zheng, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 25 days.

(21) Appl. No.: 18/178,220

(22) Filed: Mar. 3, 2023

(65) Prior Publication Data

US 2024/0153122 A1 May 9, 2024

Related U.S. Application Data

(63) Continuation of application No. PCT/CN2021/115734, filed on Aug. 31, 2021.

(30) Foreign Application Priority Data

Sep. 3, 2020 (CN) .......................... 202010915758.3

(51) Int. Cl.
*G06T 7/593* (2017.01)
*B64D 47/08* (2006.01)
(Continued)

(52) U.S. Cl.
CPC .............. *G06T 7/596* (2017.01); *B64U 20/70* (2023.01); *G05D 1/2435* (2024.01);
(Continued)

(58) Field of Classification Search
None
See application file for complete search history.

(56) References Cited

U.S. PATENT DOCUMENTS

2015/0103147 A1* 4/2015 Ho ............................ G06T 7/85
348/47
2017/0225680 A1* 8/2017 Huang ...................... G08G 5/04
(Continued)

FOREIGN PATENT DOCUMENTS

| CN | 106384382 A | 2/2017 |
|---|---|---|
| CN | 107483911 A | 12/2017 |

(Continued)

OTHER PUBLICATIONS

Machine translated CN 107483911 A . (Year: 2017).*
The International Search Report mailed Dec. 8, 2021; PCT/CN/2021/115734.

*Primary Examiner* — Hung Q Dang

(57) ABSTRACT

A binocular vision-based environment sensing method and apparatus, is applied to an unmanned aerial vehicle. The unmanned aerial vehicle is provided with five binocular cameras. The first binocular camera is disposed at the front portion of the fuselage of the unmanned aerial vehicle. The second binocular camera is inclined upward and disposed between the left side of the fuselage and the upper portion of the fuselage of the unmanned aerial vehicle. The third binocular camera is inclined upward and disposed between the right side of the fuselage and the upper portion of the fuselage of the unmanned aerial vehicle. The fourth binocular camera is disposed at the lower portion of the fuselage of the unmanned aerial vehicle. The fifth binocular camera disposed at the rear portion of the fuselage of the unmanned aerial vehicle. The method can simplify an omni-directional sensing system while reducing the sensing blind area.

18 Claims, 8 Drawing Sheets

(51) Int. Cl.

| | |
|---|---|
| *B64U 20/70* | (2023.01) |
| *G01C 11/02* | (2006.01) |
| *G01C 11/06* | (2006.01) |
| *G01C 11/34* | (2006.01) |
| *G01C 21/00* | (2006.01) |
| *G05D 1/243* | (2024.01) |
| *G06T 7/80* | (2017.01) |
| *G06T 17/05* | (2011.01) |
| *G06T 17/20* | (2006.01) |
| *G06V 20/13* | (2022.01) |
| *H04N 13/239* | (2018.01) |
| *H04N 13/243* | (2018.01) |
| *H04N 13/282* | (2018.01) |
| *H04N 23/90* | (2023.01) |
| *B64U 101/30* | (2023.01) |
| *G05D 109/25* | (2024.01) |
| *G05D 111/10* | (2024.01) |
| *H04N 13/00* | (2018.01) |

(52) U.S. Cl.
CPC ......... *H04N 13/239* (2018.05); *H04N 13/282* (2018.05); *H04N 23/90* (2023.01); *B64U 2101/30* (2023.01); *G05D 2109/254* (2024.01); *G05D 2111/10* (2024.01); *G06T 2207/10012* (2013.01); *G06T 2207/10032* (2013.01); *G06T 2207/20221* (2013.01); *H04N 2013/0081* (2013.01)

(56) References Cited

U.S. PATENT DOCUMENTS

| | | | |
|---|---|---|---|
| 2019/0133692 A1* | 5/2019 | Mariampillai | A61B 90/30 |
| 2019/0273909 A1 | 9/2019 | Ye et al. | |
| 2019/0301861 A1* | 10/2019 | Wang | G01C 3/14 |
| 2020/0342570 A1* | 10/2020 | Yuan | H04N 13/156 |
| 2021/0168283 A1* | 6/2021 | Esfahani | G06V 20/52 |
| 2022/0060677 A1* | 2/2022 | Park | G06V 40/10 |

FOREIGN PATENT DOCUMENTS

| | | | | |
|---|---|---|---|---|
| CN | 108489454 A | | 9/2018 | |
| CN | 109029417 A | | 12/2018 | |
| CN | 109883398 A | | 6/2019 | |
| CN | 110225249 A | | 9/2019 | |
| CN | 110799853 A | | 2/2020 | |
| CN | 110880202 A | | 3/2020 | |
| CN | 111897356 A | * | 11/2020 | ............ B64U 10/14 |
| CN | 112052788 A | | 12/2020 | |
| WO | WO-2019139858 A1 | * | 7/2019 | ........... G06T 3/0012 |
| WO | WO-2021203770 A1 | * | 10/2021 | ........... H04N 13/161 |

* cited by examiner

BINOCULAR VISION-BASED ENVIRONMENT SENSING METHOD AND APPARATUS, AND UNMANNED AERIAL VEHICLE

CROSS-REFERENCE TO RELATED APPLICATION

This application is a continuation application of PCT application No. PCT/CN2021/115734, filed on Aug. 31, 2021, which claims the benefit of priority of Chinese Patent Application No. 2020109157583, filed on Sep. 3, 2020, the entire contents of which are incorporated herein by reference.

BACKGROUND

Technical Field

Embodiments of the application relate to the technical field of aircraft, and in particular, to a binocular vision-based environment sensing method and apparatus, and an unmanned aerial vehicle.

Related Art

With the continuous development of aircraft-related technologies, Unmanned Aerial Vehicles (UAVs), also known as UAVs, have become a hot topic in many fields. In recent years, for example, unmanned aerial vehicles (UAVs) have been widely used in disaster investigation and rescue, aerial surveillance, transmission line inspection, aerial photography, aerial survey, and military fields.

In order to realize obstacle avoidance, braking and path planning, unmanned aerial vehicles (UAVs) are equipped with sensors for environment sensing, and typical sensors include ultrasonic sensors, infrared sensors, TOF sensors and visual sensors. Among them, ultrasonic sensors, infrared sensors and TOF sensors cannot acquire flight images and are usually used as auxiliary sensing means; although monocular vision sensors (i.e. monocular cameras) output abundant information with low hardware cost, the acquired flight images are two-dimensional and difficult to meet complicated application scenes; however, the binocular vision sensors (i.e. binocular cameras) can directly restore the three-dimensional coordinates of the measured point because of the stereo vision information generated thereby based on the disparity principle, which have become popular sensing sensors.

However, limited by volume or cost, unmanned aerial vehicles are only partially equipped with binocular cameras, which cannot achieve omni-directional sensing. Even if the unmanned aerial vehicles are equipped with 6 binocular cameras, the viewing angle is narrow because some binocular vision sensors are easily blocked by the arm, there is still a certain sensing blind area.

SUMMARY OF THE DISCLOSURE

The embodiment of the disclosure is to provide a binocular vision-based environment sensing method and apparatus, and an unmanned aerial vehicle, which can simplify an omni-directional sensing system while reducing the sensing blind area.

In order to achieve the above-mentioned object, one technical solution adopted by an embodiment of the disclosure is: in a first aspect, a binocular vision-based environment sensing method is provided. The method is applied to an unmanned aerial vehicle provided with five binocular cameras. The five binocular cameras include a first binocular camera, a second binocular camera, a third binocular camera, a fourth binocular camera and a fifth binocular camera. The first binocular camera is disposed at a front portion of a fuselage of the unmanned aerial vehicle. The second binocular camera is inclined upward and disposed between a left side of the fuselage and an upper portion of the fuselage of the unmanned aerial vehicle. The third binocular camera is inclined upward and disposed between a right side of the fuselage and the upper portion of the fuselage of the unmanned aerial vehicle. The fourth binocular camera is disposed at a lower portion of the fuselage of the unmanned aerial vehicle. The fifth binocular camera is disposed at a rear portion of the fuselage of the unmanned aerial vehicle. The binocular vision-based environment sensing method includes:

acquiring a binocular view by using each binocular camera among the five binocular cameras, and generating disparity maps according to the binocular views;

separately generating initial three-dimensional (3D) point cloud data according to the disparity maps and internal parameters of the binocular cameras corresponding thereto;

converting coordinate systems of the initial 3D point cloud data into world coordinate systems, respectively, so as to acquire 3D point cloud data in five world coordinate systems;

constructing a 3D map of a target scene according to the 3D point cloud data in the five world coordinate systems.

Optionally, an optical center line of any binocular camera is parallel to a horizontal plane, and two optical axes of any binocular camera are parallel to each other.

Optionally, an optical axis of the second binocular camera and an optical axis of the third binocular camera each have an angle $\alpha$ to a horizontal plane.

In some embodiments, a vertical viewing angle $H_2$ of the second binocular camera, a vertical viewing angle $H_3$ of the third binocular camera and a vertical viewing angle $H_4$ of the fourth binocular camera satisfy: $H_2+H_3+H_4>360°$; and the vertical viewing angle of the second binocular camera partially overlaps the vertical viewing angle of the third binocular camera, the vertical viewing angle of the third binocular camera partially overlaps the vertical viewing angle of the fourth binocular camera, and the vertical viewing angle of the fourth binocular camera partially overlaps the vertical viewing angle of the second binocular camera.

Optionally, the vertical viewing angle $H_2$ of the second binocular camera, the vertical viewing angle $H_3$ of the third binocular camera and the vertical viewing angle $H_4$ of the fourth binocular camera further satisfy the following conditions:

$H_2+H_4-2\alpha>180°$;
$H_3+H_4-2\alpha>180°$;
$H_2+H_3>180°$.

In some embodiments, a horizontal viewing angle $V_1$ of the first binocular, a horizontal viewing angle $V_2$ of the second binocular camera, a horizontal viewing angle $V_3$ of the third binocular camera and a horizontal viewing angle $V_5$ of the fifth binocular satisfy: $V_1+V_2+V_3+V_5>360°$; and the horizontal viewing angle of the first binocular camera partially overlaps the horizontal viewing angle of the second binocular camera, the horizontal viewing angle of the second binocular camera partially overlaps the horizontal viewing angle of the fifth binocular camera, the horizontal viewing angle of the fifth binocular camera partially overlaps the horizontal viewing angle of the third binocular camera, and the horizontal viewing angle of the third binocular camera partially overlaps the horizontal viewing angle of the first binocular camera.

Optionally, the horizontal viewing angle $V_1$ of the first binocular, the horizontal viewing angle $V_2$ of the second binocular camera, the horizontal viewing angle $V_3$ of the third binocular camera and the horizontal viewing angle $V_5$ of the fifth binocular further satisfy the following conditions:

$V_1+V_2>180°$;
$V_2+V_5>180°$;
$V_5+V_3>180°$;
$V_3+V_1>180°$.

In some embodiments, the vertical viewing angle $H_1$ of the first binocular, the horizontal viewing angle $V_2$ of the second binocular, the vertical viewing angle $H_4$ of the fourth binocular and the horizontal viewing angle $V_5$ of the fifth binocular satisfy: $H_1+V_2+H_4+V_5>360°$; and the vertical viewing angle of the first binocular partially overlaps the horizontal viewing angle of the second binocular, the horizontal viewing angle of the second binocular partially overlaps the vertical viewing angle of the fourth binocular, and the vertical viewing angle of the fourth binocular partially overlaps the horizontal viewing angle of the fifth binocular.

Optionally, the vertical viewing angle $H_1$ of the first binocular, the horizontal viewing angle $V_2$ of the second binocular, the vertical viewing angle $H_4$ of the fourth binocular and the horizontal viewing angle $V_5$ of the fifth binocular further satisfy the following conditions:

$H_1+V_2>180°$;
$V_2+H_4>180°$;
$H_4+V_5>180°$;
$V_5+H_1>180°$.

Optionally, the horizontal viewing angle of the third binocular is equal to the horizontal viewing angle of the second binocular.

In some embodiments, before the acquiring a binocular view by using each binocular camera among the five binocular cameras, and generating disparity maps according to the binocular views, the method further includes:

in a pre-set environment, acquiring a control binocular view by using each binocular camera among the five binocular cameras;

if it is determined that there is an occlusion area formed by a body of the unmanned aerial vehicle on left and right views in the control binocular view, respectively constructing a left mask and a right mask according to the occlusion area, generating mask views corresponding to the binocular camera according to the left mask and the right mask, and storing the mask views;

then the generating initial three-dimensional point cloud data according to the disparity maps and internal parameters of the binocular cameras corresponding thereto, specifically including:

fusing the disparity map and a mask view corresponding to the binocular camera to generate a fused disparity map;

generating initial three-dimensional point cloud data according to the fused disparity map and the internal parameters of the binocular camera.

Optionally, the occlusion area formed by the body of the unmanned aerial vehicle includes at least one of:

an occlusion area formed by an arm of the unmanned aerial vehicle, an occlusion area formed by a fuselage of the unmanned aerial vehicle, an occlusion area formed by a power apparatus of the unmanned aerial vehicle, and an occlusion area formed by a protection apparatus of the unmanned aerial vehicle.

In a second aspect, a binocular vision-based environment sensing apparatus is provided. The apparatus is applied to an unmanned aerial vehicle provided with five binocular cameras. The five binocular cameras include a first binocular camera, a second binocular camera, a third binocular camera, a fourth binocular camera and a fifth binocular camera. The first binocular camera is disposed at a front portion of a fuselage of the unmanned aerial vehicle. The second binocular camera is inclined upward and disposed between a left side of the fuselage and an upper portion of the fuselage of the unmanned aerial vehicle. The third binocular camera is inclined upward and disposed between a right side of the fuselage and the upper portion of the fuselage of the unmanned aerial vehicle. The fourth binocular camera is disposed at a lower portion of the fuselage of the unmanned aerial vehicle. The fifth binocular camera is disposed at a rear portion of the fuselage of the unmanned aerial vehicle. The binocular vision-based environment sensing apparatus includes:

a disparity map generation module for acquiring a binocular view by using each binocular camera among the five binocular cameras, and generating disparity maps according to the binocular views;

an initial point cloud data generation module for separately generating initial three-dimensional (3D) point cloud data according to the disparity maps and internal parameters of the binocular cameras corresponding thereto;

a point cloud data generation module for converting coordinate systems of the initial 3D point cloud data into world coordinate systems, respectively, so as to acquire 3D point cloud data in five world coordinate systems;

a three-dimensional map construction module for constructing a 3D map of a target scene according to the 3D point cloud data in the five world coordinate systems.

Optionally, the binocular vision-based environment sensing apparatus further includes:

a control binocular view acquisition module for, in a pre-set environment, acquiring a control binocular view by using each binocular camera among the five binocular cameras;

a mask view generation module for, if it is determined that there is an occlusion area formed by a body of the unmanned aerial vehicle on left and right views in the control binocular view, respectively constructing a left mask and a right mask according to the occlusion area, generating mask views corresponding to the binocular camera according to the left mask and the right mask, and storing the mask views;

the initial point cloud data generation module further for fusing the disparity map and a mask view corresponding to the binocular camera to generate a fused disparity map; generating initial three-dimensional point cloud data according to the fused disparity map and the internal parameters of the binocular camera.

In a third aspect, an unmanned aerial vehicle is provided. The unmanned aerial vehicle includes:

a first binocular camera disposed at a front portion of a fuselage of the unmanned aerial vehicle;

a second binocular camera inclined upward and disposed between a left side of the fuselage and an upper portion of the fuselage of the unmanned aerial vehicle;

a third binocular camera inclined upward and disposed between a right side of the fuselage and the upper portion of the fuselage of the unmanned aerial vehicle;

a fourth binocular camera disposed at a lower portion of the fuselage of the unmanned aerial vehicle;

a fifth binocular camera disposed at a rear portion of the fuselage of the unmanned aerial vehicle;

a controller respectively connected to the first binocular camera, the second binocular camera, the third binocular camera, the fourth binocular camera and the fifth binocular camera, the controller including: at least one processor, and a memory communicatively connected to the at least one processor, the memory storing instructions executable by the at least one processor, the instructions being executable by the at least one processor to enable the at least one processor to perform the method as described above.

In a fourth aspect, another unmanned aerial vehicle is provided. The unmanned aerial vehicle includes:

a first binocular camera disposed at a front portion of a fuselage of the unmanned aerial vehicle;

a second binocular camera inclined upward and disposed between a left side of the fuselage and an upper portion of the fuselage of the unmanned aerial vehicle;

a third binocular camera inclined upward and disposed between a right side of the fuselage and the upper portion of the fuselage of the unmanned aerial vehicle;

a fourth binocular camera disposed at a lower portion of the fuselage of the unmanned aerial vehicle;

a fifth binocular camera disposed at a rear portion of the fuselage of the unmanned aerial vehicle; and a controller respectively connected to the first binocular camera, the second binocular camera, the third binocular camera, the fourth binocular camera and the fifth binocular camera;

wherein the first binocular camera, the second binocular camera, the third binocular camera, the fourth binocular camera and the fifth binocular camera are all used for acquiring a binocular view and generating disparity maps according to the binocular views; generating initial three-dimensional (3D) point cloud data according to the disparity maps and internal parameters thereof; and converting coordinate systems of the initial 3D point cloud data into world coordinate systems, so as to acquire 3D point cloud data in world coordinate systems;

the controller is used for constructing a 3D map of a target scene according to the 3D point cloud data of the first binocular camera, the second binocular camera, the third binocular camera, the fourth binocular camera and the fifth binocular camera.

Optionally, the first binocular camera, the second binocular camera, the third binocular camera, the fourth binocular camera, and the fifth binocular camera are all further used in a pre-set environment for acquiring a control binocular view; if it is determined that there is an occlusion area formed by a body of the unmanned aerial vehicle on left and right views in the control binocular view, respectively constructing a left mask and a right mask according to the occlusion area, generating mask views corresponding to the binocular camera according to the left mask and the right mask, and storing the mask views; fusing the disparity map and a mask view corresponding to the binocular camera to generate a fused disparity map; generating initial three-dimensional point cloud data according to the fused disparity map and the internal parameters of the binocular camera.

In a fifth aspect, the embodiment of the disclosure provides a nonvolatile computer-readable storage medium storing computer executable instructions executable by an unmanned aerial vehicle, so as to perform the method as described above.

In a sixth aspect, the embodiment of the disclosure provides a computer program product including a computer program stored on a nonvolatile computer-readable storage medium, the computer program including program instructions executable by an unmanned aerial vehicle, so as to perform the method as described above.

The advantageous effects of the embodiment of the disclosure are as follows: the unmanned aerial vehicle is provided with five binocular cameras, and the five binocular cameras include a first binocular camera, a second binocular camera, a third binocular camera, a fourth binocular camera and a fifth binocular camera. The first binocular camera is disposed at a front portion of a fuselage of the unmanned aerial vehicle, the second binocular camera is inclined upward and disposed between a left side of the fuselage and an upper portion of the fuselage of the unmanned aerial vehicle, the third binocular camera is inclined upward and disposed between a right side of the fuselage and the upper portion of the fuselage of the unmanned aerial vehicle, the fourth binocular camera is disposed at a lower portion of the fuselage of the unmanned aerial vehicle, and the fifth binocular camera disposed at a rear portion of the fuselage of the unmanned aerial vehicle. The setting of a binocular camera can be reduced and the omni-directional sensing system can be simplified by using five binocular cameras to sense the environment information of six orientations, namely in front of, behind, at the left side of, at the right side of, above and below the unmanned aerial vehicle. In addition, the inclined setting of the binocular cameras on the left and right sides can reduce the occlusion of the body of the unmanned aerial vehicle and reduce the sensing blind area.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

Hereinafter, embodiments of the disclosure will be described with reference to the accompanying drawings. It is obvious that the embodiments to be described are only a part rather than all of the embodiments of the disclosure. All other embodiments obtained by a person of ordinary skill in the art based on the embodiments of the disclosure without creative efforts shall fall within the protection scope of the disclosure.

It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", and similar expressions in this specification are merely used for an illustrative purpose.

In addition, the technical features provided in different embodiments of the disclosure to be described below may be combined with each other as long as no conflict occurs.

Figure 1:
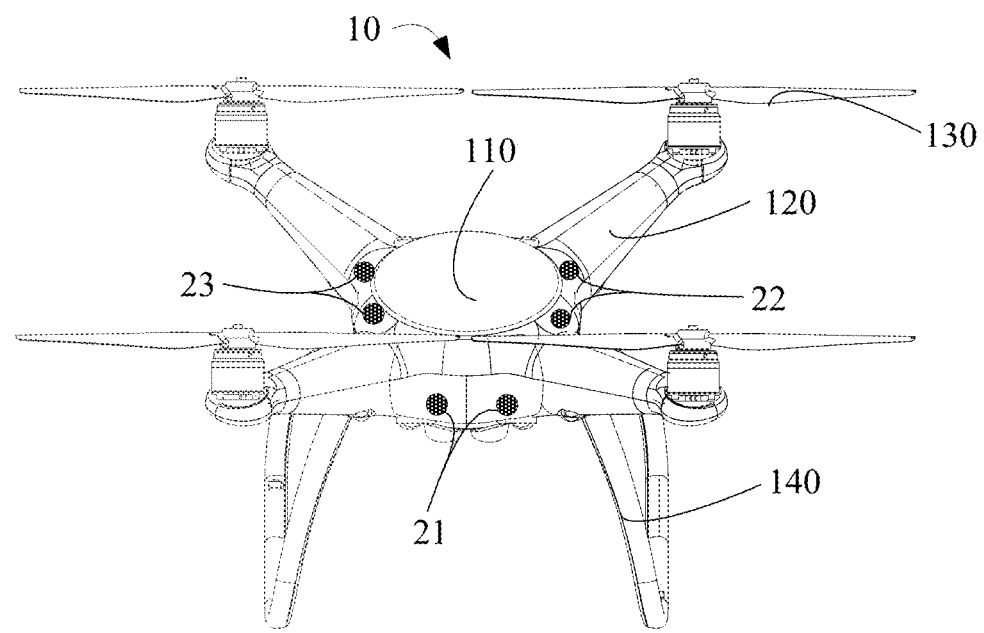
FIG. 1 is a schematic structural diagram of an implementation environment related to an embodiment of the disclosure.

FIG. 1 is a schematic diagram of an implementation environment related to various embodiments of the disclosure. As shown in FIG. 1, an unmanned aerial vehicle 10 is provided, and a plurality of binocular cameras are disposed at different orientations of the unmanned aerial vehicle 10 to acquire a flight environment around the unmanned aerial vehicle 10.

The unmanned aerial vehicle 10 includes a body including a fuselage 110, arms 120 connected to the fuselage 110, and a power apparatus 130 on each of the arms 120 for providing flight power to the unmanned aerial vehicle 10, mainly including a motor (e.g. a brushless motor) and a propeller connected to the motor.

In the figure, a four-rotor unmanned aerial vehicle is taken as an example. The unmanned aerial vehicle 10 may also be a three-rotor unmanned aerial vehicle, a six-rotor unmanned aerial vehicle, a fixed-wing unmanned aerial vehicle, etc. The arm 120 may also be folded relative to the fuselage 110 for ease of storage and carrying.

Optionally, the unmanned aerial vehicle 10 also includes a landing gear 140 connected to the bottom portion of the fuselage 110 or the arm 120.

The plurality of binocular cameras include: a first binocular camera 21 disposed at the front portion of the fuselage 110 of the unmanned aerial vehicle 10, a second binocular camera 22 inclined upward and disposed between the left side of the fuselage 110 and the upper portion of the fuselage of the unmanned aerial vehicle 10, a third binocular camera 23 inclined upward and disposed between the right side of the fuselage 110 and the upper portion of the fuselage 110 of the unmanned aerial vehicle 10, a fourth binocular camera 24 (not shown in FIG. 1) disposed at the lower portion of the fuselage 110 of the unmanned aerial vehicle 10, and a fifth binocular camera 25 (not shown in FIG. 1) disposed at the rear portion of the fuselage 110 of the unmanned aerial vehicle 10.

Each binocular camera includes two cameras (i.e., a left camera and a right camera), and an image processor. Two images of the measured object are acquired from different positions by the left and right cameras, and the image processor acquires three-dimensional geometric information of the object by calculating the positional deviation between corresponding points of the images based on the disparity principle.

Figure 2:
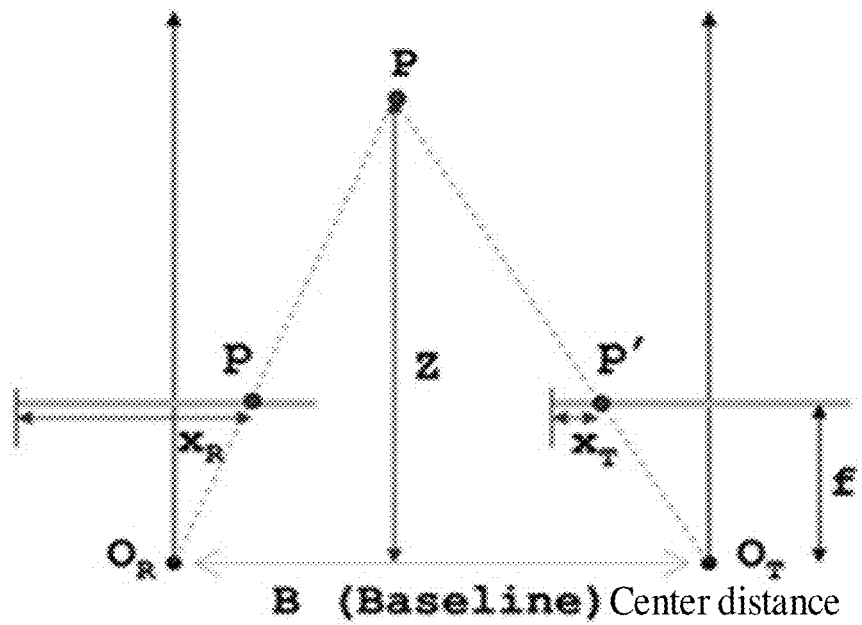
FIG. 2 is a schematic diagram of a binocular ranging principle provided by an embodiment of the disclosure.

As shown in FIG. 2, the feature point P is a certain point on the photographed object, $O_R$ and $O_T$ are the optical centers of two cameras respectively, the imaging points of the feature point P on the photoreceptors of the two cameras are P and P' respectively (the imaging plane of the camera being placed in front of the lens after being rotated), f is the focal length of the camera, B (Baseline) is the center distance between the two cameras, Z is the depth information to be obtained, and assuming that the distance from the point P to the point P' is dis, then:

$$dis = B - (X_R - X_T);$$

According to the principle of similar triangles:

$$\frac{B - (X_R - X_T)}{B} = \frac{Z - f}{Z}$$

it can be obtained that:

$$Z = \frac{fB}{X_R - X_T};$$

wherein the focal length f and the center distance B between the two cameras can be obtained through calibration, and therefore, as long as the value of $(X_R - X_T)$ is obtained, namely, the disparity of the corresponding X coordinates of the same spatial point in the imaging of two cameras, the depth information about the point P can be obtained. Further, the image processor can also calculate the three-dimensional coordinates of the point P in the camera coordinate system and in the world coordinate system by the internal parameter and external parameter obtained through calibration.

Wherein, the internal parameter of the binocular camera reflects the projection relationship between the camera coordinate system and the image coordinate system, and the external parameter of the binocular camera reflects the relationship of rotation R and translation T between the camera coordinate system and the world coordinate system. The internal parameter and external parameter of the binocular camera can be calculated by placing a special calibration reference (usually chessboard) in front of the binocular camera so that the binocular camera acquires an image of the object.

Specifically, the three-dimensional coordinates of the feature point P in the camera coordinate system can be obtained by the following formula:

$$zi = \frac{fx * B}{disparity};$$

$$xi = \frac{(px - cx) * zi}{fx};$$

$$yi = \frac{(py - cy) * zi}{fy};$$

wherein cx, cy, fx and fy are internal parameters of the binocular camera; px and py are the pixel coordinates of the feature point P on the disparity map.

According to the relationship between the camera coordinate system and the world coordinate system, the binocular camera coordinate system can be converted to the world coordinate system of the unmanned aerial vehicle 10 by the corresponding external parameter matrix. In practical application, if px and py adopt the pixel coordinates in the left image, the three-dimensional coordinates of the feature point P in the world coordinate system are calculated using the mapping relationship between the left camera and the world coordinate, taking the left image as a reference; if px and py adopt the pixel coordinates in the right image, the three-dimensional coordinates of the feature point P in the world coordinate system are calculated using the mapping relationship between the right camera and the world coordinate, taking the right image as a reference.

Figure 3:
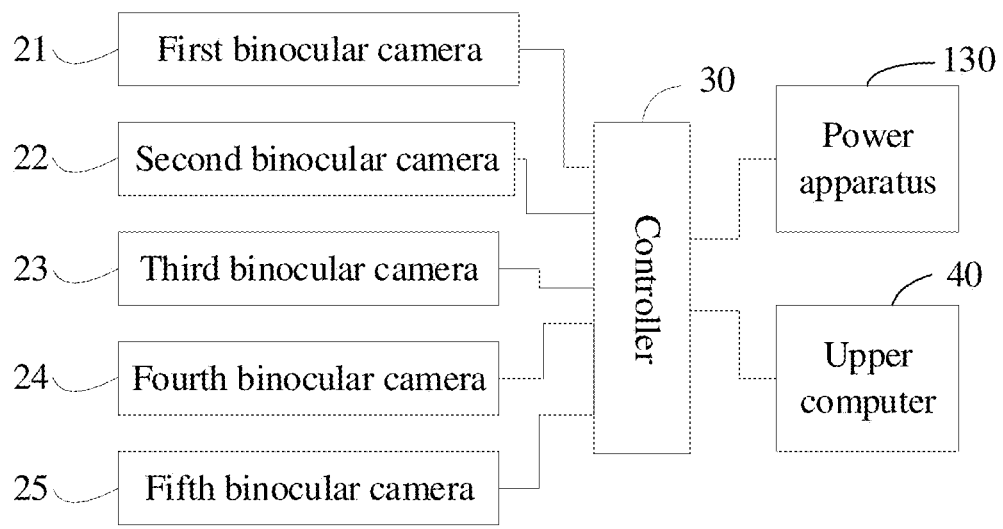
FIG. 3 is a schematic hardware structural diagram of an implementation environment related to an embodiment of the disclosure.

As shown in FIG. 3, the unmanned aerial vehicle 10 further includes a controller 30 mounted on the body. The first binocular camera 21, the second binocular camera 22, the third binocular camera 23, the fourth binocular camera 24 and the fifth binocular camera 25 are all connected to the controller 30, and the controller 30 is used for acquiring three-dimensional point cloud data transmitted by an image processor of each binocular camera 25, and constructing a three-dimensional map or a three-dimensional modeling according to the three-dimensional point cloud data so as to control the power apparatus 130 to perform tasks such as obstacle avoidance, braking and path planning.

It will be appreciated that the above-described construction of a three-dimensional map or three-dimensional modeling according to the three-dimensional point cloud data may also be performed by an upper computer 40 communicatively connected to the unmanned aerial vehicle 10. It will also be appreciated that there may or may not be a physical separation between the image processors of the binocular cameras and between the image processors and the controller 30; for example, the image processor of each binocular camera and the controller 30 may be integrated on the same chip, and/or the functions of the image processor of each binocular camera and the functions of the controller 30 may also be performed by the same controller.

Based on the above description, embodiments of the disclosure will be further described with reference to the accompanying drawings.

Embodiment 1

Figure 4:
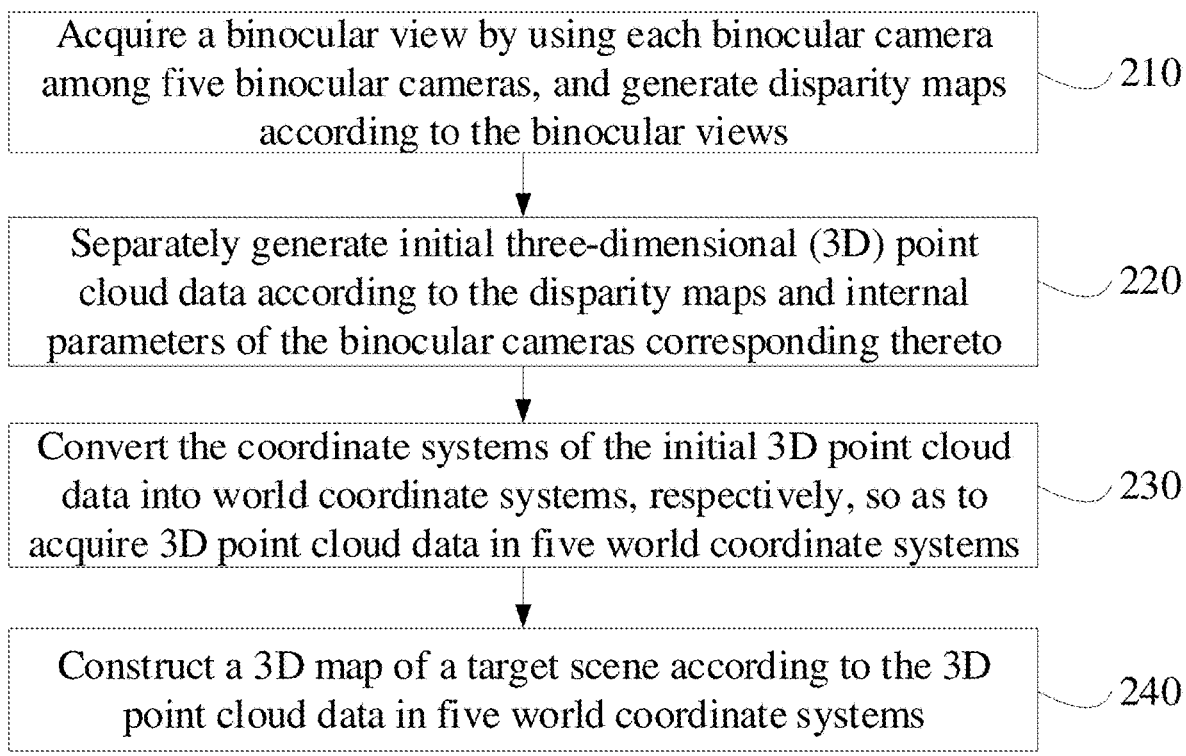
FIG. 4 is a flowchart of a binocular vision-based environment sensing method provided by an embodiment of the disclosure.

FIG. 4 is a flowchart of a binocular vision-based environment sensing method provided by an embodiment of the disclosure, the method being applied to an unmanned aerial vehicle 10 provided with five binocular cameras, the method including:

step 210: acquiring a binocular view by using each binocular camera among the five binocular cameras, and generating disparity maps according to the binocular views.

Illustratively, the five binocular cameras include a first binocular camera, a second binocular camera, a third binocular camera, a fourth binocular camera, and a fifth binocular camera, and the five binocular cameras are respectively disposed at different orientations of the unmanned aerial vehicle 10 for omni-directional acquisition of environment information around the unmanned aerial vehicle 10.

Wherein the first binocular camera is disposed at the front portion of the fuselage 110 of the unmanned aerial vehicle 10, and can be mounted on a mounting surface thereof in a lateral direction, a longitudinal direction or an oblique direction, with the optical center facing forward, for acquiring environment information in front of the unmanned aerial vehicle 10.

The second binocular camera is inclined upward and is disposed between the left side of the fuselage 110 and the upper portion of the fuselage 110 of the unmanned aerial vehicle 10, with the optical center facing left and inclining upward, for acquiring environment information at the left side of and obliquely above the unmanned aerial vehicle 10; the third binocular camera is inclined upward and is disposed between the right side of the fuselage 110 and the upper portion of the fuselage 110 of the unmanned aerial vehicle 10, with the optical center facing right and inclining upward, for acquiring environment information at the right side of and obliquely above the unmanned aerial vehicle 10. By inclining the second binocular camera and the third binocular camera, it is possible not only to reduce a binocular camera disposed on the upper portion of the fuselage 110 of the unmanned aerial vehicle 10, but also to reduce (or even remove) the occlusion of the body, in particular the arm 120 of the unmanned aerial vehicle 10, and to reduce the sensing blind area.

The fourth binocular camera is disposed at the lower portion of the fuselage 110 of the unmanned aerial vehicle 10, and can be mounted on a mounting surface thereof in a lateral direction, a longitudinal direction or an oblique direction, with the optical center facing downward, for acquiring environment information below the unmanned aerial vehicle 10.

The fifth binocular camera is disposed at the rear portion of the fuselage 110 of the unmanned aerial vehicle 10, and can be mounted on a mounting surface thereof in a lateral direction, a longitudinal direction or an oblique direction, with the optical center facing backward, for acquiring environment information behind the unmanned aerial vehicle 10.

The step specifically includes: acquiring a first binocular view by a first binocular camera, and generating a first disparity map according to the first binocular view; acquiring a second binocular view by a second binocular camera, and generating a second disparity map according to the second binocular view; acquiring a third binocular view by a third binocular camera, and generating a third disparity map according to the third binocular view; acquiring a fourth binocular view by a fourth binocular camera, and generating a fourth disparity map according to the fourth binocular view; acquiring a fifth binocular view by a fifth binocular camera, and generating a fifth disparity map according to the fifth binocular view.

A corresponding disparity map may be generated according to the binocular view based on a binocular matching algorithm. In one embodiment, the disparity map is calculated by using the BM algorithm or the SGBM algorithm after stereo correction of the two images of the binocular view.

Step 220: separately generating initial three-dimensional (3D) point cloud data according to the disparity maps and internal parameters of the binocular cameras corresponding thereto.

In the previous step, the acquired first disparity map corresponds to the first binocular camera, the second disparity map corresponds to the second binocular camera, the third disparity map corresponds to the third binocular camera, the fourth disparity map corresponds to the fourth binocular camera, and the fifth disparity map corresponds to the fifth binocular camera; then the step specifically includes: generating a first initial three-dimensional point cloud data according to the first disparity map and the internal parameters of the first binocular camera; generating a second initial three-dimensional point cloud data according to the second disparity map and the internal parameters of the second binocular camera; generating a third initial three-dimensional point cloud data according to the third disparity map and the internal parameters of the third binocular camera; generating a fourth initial three-dimensional point cloud data according to the fourth disparity map and the internal parameters of the fourth binocular camera; and generating a fifth initial three-dimensional point cloud data according to the fifth disparity map and the internal parameters of the fifth binocular camera.

The three-dimensional coordinates of each feature point in each disparity map can be obtained by using the following formula:

$$zi = \frac{fx * B}{disparity};$$

$$xi = \frac{(px - cx) * zi}{fx};$$

$$yi = \frac{(py - cy) * zi}{fy};$$

wherein B is a baseline length, disparity is disparity data acquired from a disparity map, cx, cy, fx and fy are internal parameters of a corresponding binocular camera, and px and py are pixel coordinates of a point P on the disparity map, namely, pixel coordinates of the point P in a left image or pixel coordinates of the point P in a right image.

The initial three-dimensional point cloud data may be represented as a matrix Pcam, $$p_{cam} = \left[ \begin{pmatrix} x_0 & y_0 & z_0 \\ \vdots & \vdots & \vdots \\ x_N & y_N & z_N \end{pmatrix} \right]$$

constructed from three-dimensional coordinates of the N feature points.

Step 230: converting coordinate systems of the initial 3D point cloud data into world coordinate systems, respectively, so as to acquire 3D point cloud data in five world coordinate systems.

The step specifically includes: converting a coordinate system of the first initial three-dimensional point cloud data into a world coordinate system according to an external parameter matrix of the first binocular camera, so as to acquire the first three-dimensional point cloud data in the world coordinate system; converting a coordinate system of the second initial three-dimensional point cloud data into a world coordinate system according to an external parameter matrix of the second binocular camera, so as to acquire the second three-dimensional point cloud data in the world coordinate system; converting a coordinate system of the third initial three-dimensional point cloud data into a world coordinate system according to an external parameter matrix of the third binocular camera, so as to acquire the third three-dimensional point cloud data in the world coordinate system; converting a coordinate system of the fourth initial three-dimensional point cloud data into a world coordinate system according to an external parameter matrix of the fourth binocular camera, so as to acquire the fourth three-dimensional point cloud data in the world coordinate system; and converting a coordinate system of the fifth initial three-dimensional point cloud data into a world coordinate system according to an external parameter matrix of the fifth binocular camera, so as to acquire the fifth three-dimensional point cloud data in the world coordinate system.

That converting a coordinate system of the initial three-dimensional point cloud data into a world coordinate system according to an external parameter matrix of the binocular camera can be obtained by the formula $p_{world} = T \times p_{cam}^T$, wherein T is the corresponding external parameter matrix of the binocular camera.

Step 240: constructing a 3D map of a target scene according to the 3D point cloud data in the five world coordinate systems.

That is, a three-dimensional map of the target scene is constructed according to the first three-dimensional point cloud data, the second three-dimensional point cloud data, the third three-dimensional point cloud data, the fourth three-dimensional point cloud data, and the fifth three-dimensional point cloud data in the world coordinate systems. The existing octree, ewok, point cloud maps, mesh and other methods can be used for three-dimensional mapping or modeling.

Since the five groups of three-dimensional point cloud data include environment information in front of, at the left side of and obliquely above, at the right side of and obliquely above, below and behind the unmanned aerial vehicle 10, a real scene of six orientations, namely in front of, behind, at the left side of, at the right side of, above and below the unmanned aerial vehicle 10 can be reconstructed by constructing a three-dimensional map according to the five groups of three-dimensional point cloud data. If the five binocular cameras cannot perform omni-directional sensing at the same time, five groups of three-dimensional point cloud data can be acquired again by controlling the unmanned aerial vehicle 10 to rotate a certain angle, and a complete three-dimensional map can be constructed based on the three-dimensional point cloud data acquired twice or multiple times.

According to the embodiment of the disclosure, a first binocular camera is disposed at the front portion of the fuselage 110 of the unmanned aerial vehicle 10, a second binocular camera is inclined upward and is disposed between the left side of the fuselage 110 and the upper portion of the fuselage 110 of the unmanned aerial vehicle 10, a third binocular camera is inclined upward and is disposed between the right side of the fuselage and the upper portion of the fuselage 110 of the unmanned aerial vehicle 10, a fourth binocular camera is disposed at the lower portion of the fuselage 110 of the unmanned aerial vehicle 10, and a fifth binocular camera is disposed at the rear portion of the fuselage 110 of the unmanned aerial vehicle 10; the setting of a binocular camera can be reduced and the omni-directional sensing system can be simplified by using five binocular cameras to sense the environment information of six orientations, namely in front of, behind, at the left side of, at the right side of, above and below the unmanned aerial vehicle 10; at the same time, the inclined setting of the binocular cameras on the left and right sides can also reduce the occlusion of the body of the unmanned aerial vehicle 10 and reduce the sensing blind area.

Embodiment 2

Figure 5:
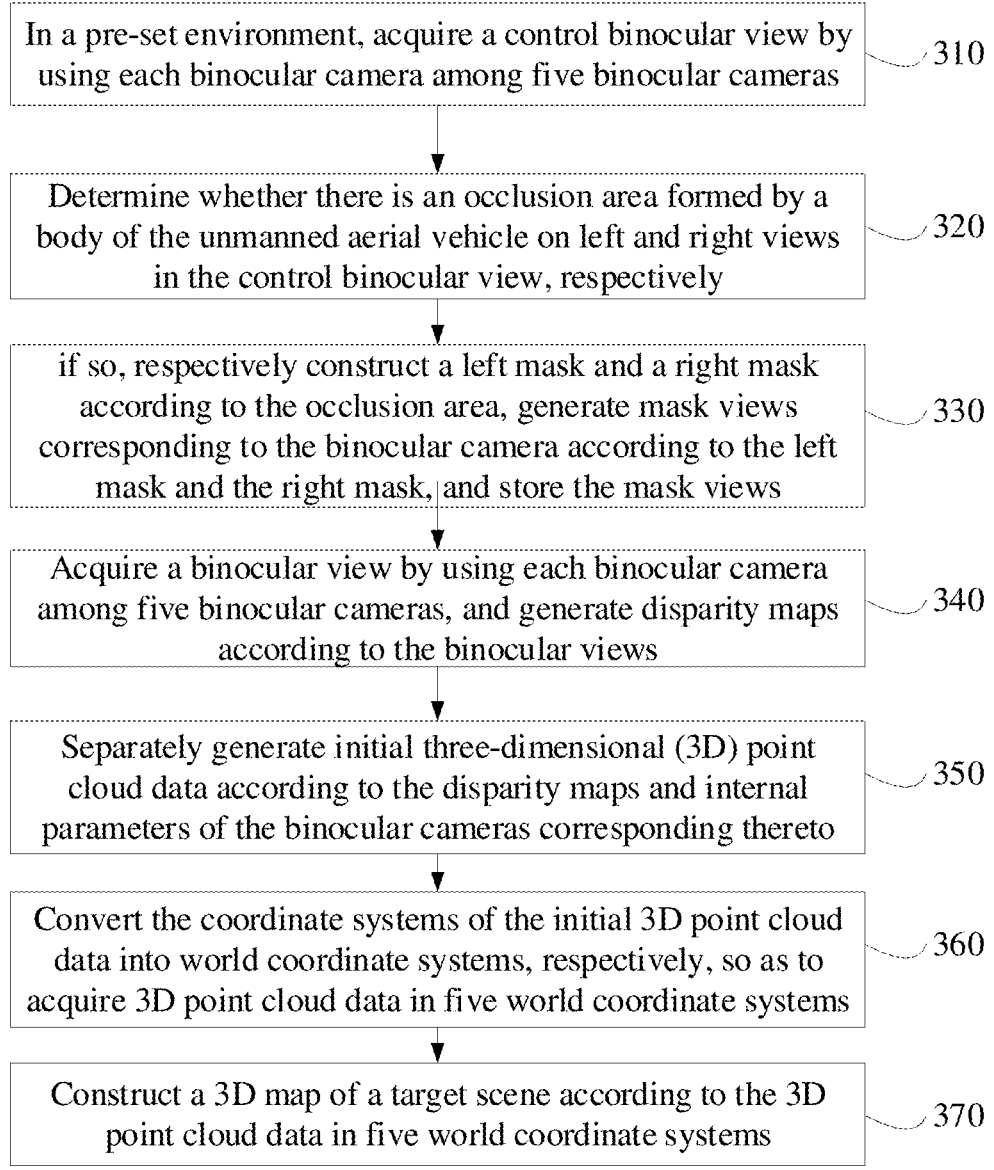
FIG. 5 is a flowchart of a binocular vision-based environment sensing method provided by another embodiment of the disclosure.

FIG. 5 is a flowchart of a binocular vision-based environment sensing method provided by another embodiment of the disclosure, the method being applied to an unmanned aerial vehicle 10, the structure of which may be the same as that of the above-described embodiment, except that the method of the embodiment includes:

step 310: in a pre-set environment, acquiring a control binocular view by using each binocular camera among the five binocular cameras.

That is, in a pre-set environment, a first control binocular view is acquired by using a first binocular camera, a second control binocular view is acquired by using a second binocular camera, a third control binocular view is acquired by using a third binocular camera, a fourth control binocular view is acquired by using a fourth binocular camera, and a fifth control binocular view is acquired by using a fifth binocular camera.

Optionally, the environment background of the pre-set environment is a single background, e.g., a white background or a green background, in order to accurately identify the occlusion area of the body of the unmanned aerial vehicle 10 in the control binocular view.

Step 320: determining whether there is an occlusion area formed by a body of the unmanned aerial vehicle 10 on left and right views in the control binocular view, respectively.

In practical application, according to the structure of the body of the unmanned aerial vehicle 10, the occlusion area formed by the body of the unmanned aerial vehicle 10 may include: an occlusion area formed by an arm 120 of the unmanned aerial vehicle 10, an occlusion area formed by a fuselage 110 of the unmanned aerial vehicle 10, an occlusion area formed by a power apparatus 130 (e.g. a propeller) of the unmanned aerial vehicle 10, and/or an occlusion area formed by a protection apparatus (e.g. a landing gear 140) of the unmanned aerial vehicle 10.

According to the structure of the body of the unmanned aerial vehicle 10 and the mounting position of the binocular camera, the occlusion area formed by the body of the unmanned aerial vehicle 10 may be different in different embodiments. For example, in one implementation environment, the occlusion area formed by the body of the unmanned aerial vehicle 10 appears in the control binocular view of the second binocular and third binocular cameras, while in another implementation environment, the occlusion area formed by the body of the unmanned aerial vehicle 10 appears in the control binocular view of the fourth binocular camera.

Thus, the step specifically includes: determining whether there is an occlusion area formed by a body of the unmanned aerial vehicle 10 on left and right views in the first control binocular views, determining whether there is an occlusion area formed by a body of the unmanned aerial vehicle 10 on left and right views in the second control binocular views, determining whether there is an occlusion area formed by a body of the unmanned aerial vehicle 10 on left and right views in the third control binocular views, determining whether there is an occlusion area formed by a body of the unmanned aerial vehicle 10 on left and right views in the fourth control binocular views; and determining whether there is an occlusion area formed by a body of the unmanned aerial vehicle 10 on left and right views in the fifth control binocular views.

Illustratively, whether there is an occlusion area formed by a body of the unmanned aerial vehicle 10 on left and right views in each of the control binocular views can be determined by means of image recognition, contour detection, image binarization, etc.

Step 330: if so, respectively constructing a left mask and a right mask according to the occlusion area, generating mask views corresponding to the binocular camera according to the left mask and the right mask, and storing the mask views.

The mask is a black and white binary image, the black area being occlusion, and the white area being reservation, and the mask is constructed, i.e. the black area and the white area of the mask are determined.

Specifically, if it is determined that there is an occlusion area formed by a body of the unmanned aerial vehicle 10 on left and right views in the first control binocular view, a first left mask and a first right mask are respectively constructed according to the occlusion area, a first mask view corresponding to the first binocular camera is generated according to the first left mask and the first right mask, and the first mask view is stored.

If it is determined that there is an occlusion area formed by a body of the unmanned aerial vehicle 10 on left and right views in the second control binocular view, a second left mask and a second right mask are respectively constructed according to the occlusion area, a second mask view corresponding to the second binocular camera is generated according to the second left mask and the second right mask, and the second mask view is stored.

If it is determined that there is an occlusion area formed by a body of the unmanned aerial vehicle 10 on left and right views in the third control binocular view, a third left mask and a third right mask are respectively constructed according to the occlusion area, a third mask view corresponding to the third binocular camera is generated according to the third left mask and the third right mask, and the third mask view is stored;

If it is determined that there is an occlusion area formed by a body of the unmanned aerial vehicle 10 on left and right views in the fourth control binocular view, a fourth left mask and a fourth right mask are respectively constructed according to the occlusion area, a fourth mask view corresponding to the fourth binocular camera is generated according to the fourth left mask and the fourth right mask, and the fourth mask view is stored.

If it is determined that there is an occlusion area formed by a body of the unmanned aerial vehicle 10 on left and right views in the fifth control binocular view, a fifth left mask and a fifth right mask are respectively constructed according to the occlusion area, a fifth mask view corresponding to the fifth binocular camera is generated according to the fifth left mask and the fifth right mask, and the fifth mask view is stored.

Figure 6:
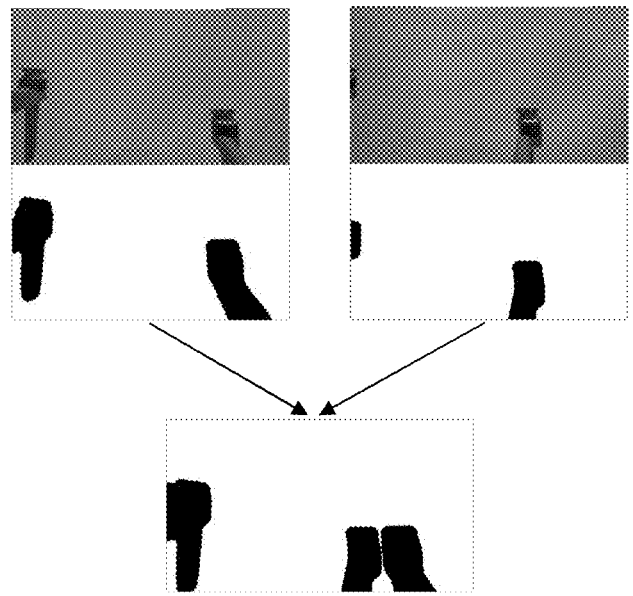
FIG. 6 is a schematic diagram of generating a mask view based on an occlusion area formed by a body of an unmanned aerial vehicle provided by an embodiment of the disclosure.

FIG. 6 is a schematic diagram of generating a mask view corresponding to the binocular camera based on an occlusion area formed by a body of an unmanned aerial vehicle 10. It will be appreciated that the black occlusion area should be slightly larger than the actual area due to the binocular algorithm matching adjacent pixels and the camera lens having mounting tolerances. Since the relative position of the binocular camera and the body of the unmanned aerial vehicle 10 is fixed, the mask view can be used as a fixed configuration for subsequent use on the disparity map output by the binocular camera.

Step 340: acquiring a binocular view by using each binocular camera among the five binocular cameras, and generating disparity maps according to the binocular views.

This step may be referred to as step 210 in Embodiment 1, which is well understood by those skilled in the art and will not be described in detail herein.

Step 350: separately generating initial three-dimensional (3D) point cloud data according to the disparity maps and internal parameters of the binocular cameras corresponding thereto.

Similar to Embodiment 1, the acquired first disparity map corresponds to a first binocular camera, the second disparity map corresponds to a second binocular camera, the third disparity map corresponds to a third binocular camera, the fourth disparity map corresponds to a fourth binocular camera, and the fifth disparity map corresponds to a fifth binocular camera. However, in the present embodiment, if the binocular camera corresponding to the disparity map also corresponds to a mask view, the step thereof specifically includes: fusing the disparity map and a mask view corresponding to the binocular camera to generate a fused disparity map; generating initial three-dimensional point cloud data according to the fused disparity map and the internal parameters of the binocular camera.

Fusing the disparity map and a mask view corresponding to the binocular camera, i.e. overlaying the mask view onto the disparity map, further removes the adverse effects caused by the occlusion of the visual field through the mask, and improves the stability of the binocular matching algorithm.

Step 360: converting coordinate systems of the initial 3D point cloud data into world coordinate systems, respectively, so as to acquire 3D point cloud data in five world coordinate systems.

Step 370: constructing a 3D map of a target scene according to the 3D point cloud data in the five world coordinate systems.

Steps 360 and 370 may be referred to as steps 230 and 240 in Embodiment 1 and will not be described in detail herein.

According to the embodiment of the disclosure, firstly, in a pre-set environment, acquiring a control binocular view by using each binocular camera among the five binocular cameras; if it is determined that there is an occlusion area formed by a body of the unmanned aerial vehicle 10 on left and right views in the control binocular view, generating mask views corresponding to the binocular camera based on the occlusion area, and storing the mask views; and fusing the mask view and a disparity map acquired subsequently, further remove the adverse effects caused by the occlusion of the visual field, and improve the stability of the binocular matching algorithm.

Embodiment 3

The embodiment of the disclosure provides an unmanned aerial vehicle 10, the structure of which differs from the structure of the unmanned aerial vehicle 10 according to the above embodiment in that an optical center line of any binocular camera of the unmanned aerial vehicle 10 of the embodiment is parallel to a horizontal plane, and two optical axes of any binocular camera are parallel to each other.

Figure 7:
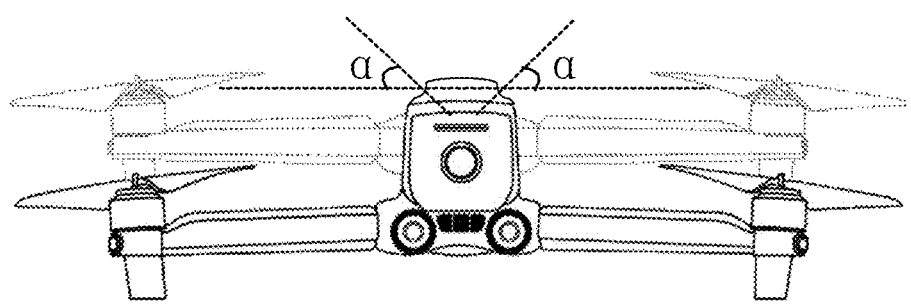
FIG. 7 is a mounting schematic diagram of a second binocular camera and a third binocular camera provided by an embodiment of the disclosure.

Optionally, as shown in FIG. 7, an optical axis of the second binocular camera and an optical axis of the third binocular camera each have an angle α to a horizontal plane, and by the above-mentioned setting, the second binocular camera and the third binocular camera can be symmetrically disposed on the left and right sides of the unmanned aerial vehicle 10.

Figure 8:
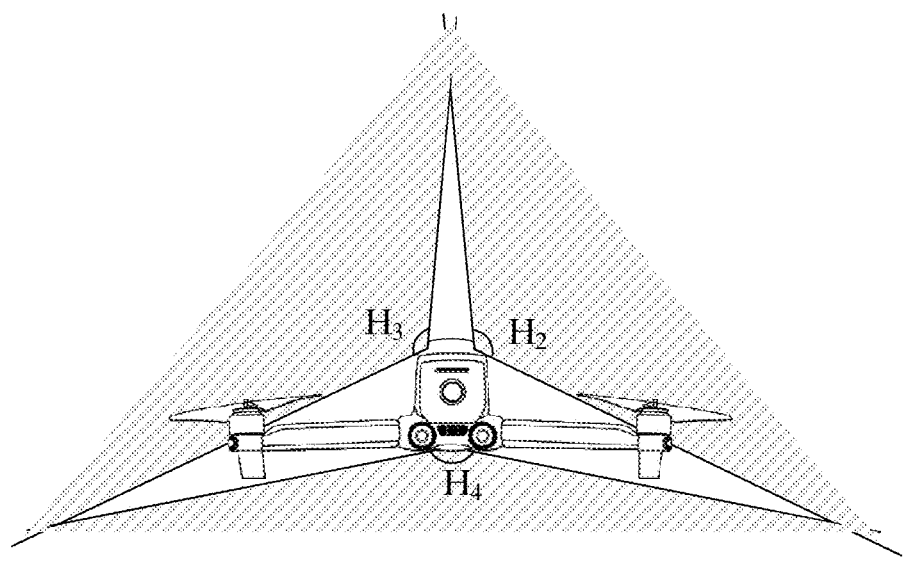
FIG. 8 is a schematic diagram of a binocular sensing area of an unmanned aerial vehicle at one viewing angle provided by an embodiment of the disclosure.

As shown in FIG. 8, on the rear/front view of the unmanned aerial vehicle 10, in order to ensure the omni-directional coverage of the binocular sensing area (shaded portion), a vertical viewing angle $H_2$ of the second binocular camera, a vertical viewing angle $H_3$ of the third binocular camera and a vertical viewing angle $H_4$ of the fourth binocular camera satisfy: $H_2+H_3+H_4>360°$; and the vertical viewing angle of the second binocular camera partially overlaps the vertical viewing angle of the third binocular camera, the vertical viewing angle of the third binocular camera partially overlaps the vertical viewing angle of the fourth binocular camera, and the vertical viewing angle of the fourth binocular camera partially overlaps the vertical viewing angle of the second binocular camera.

Further, in order to balance the sensing areas of the respective binocular cameras, the vertical viewing angle $H_2$ of the second binocular camera, the vertical viewing angle $H_3$ of the third binocular camera and the vertical viewing angle $H_4$ of the fourth binocular camera further satisfy the following conditions:

$H_2+H_4-2\alpha>180°$;
$H_3+H_4-2\alpha>180°$;
$H_2+H_3>180°$.

Figure 9:
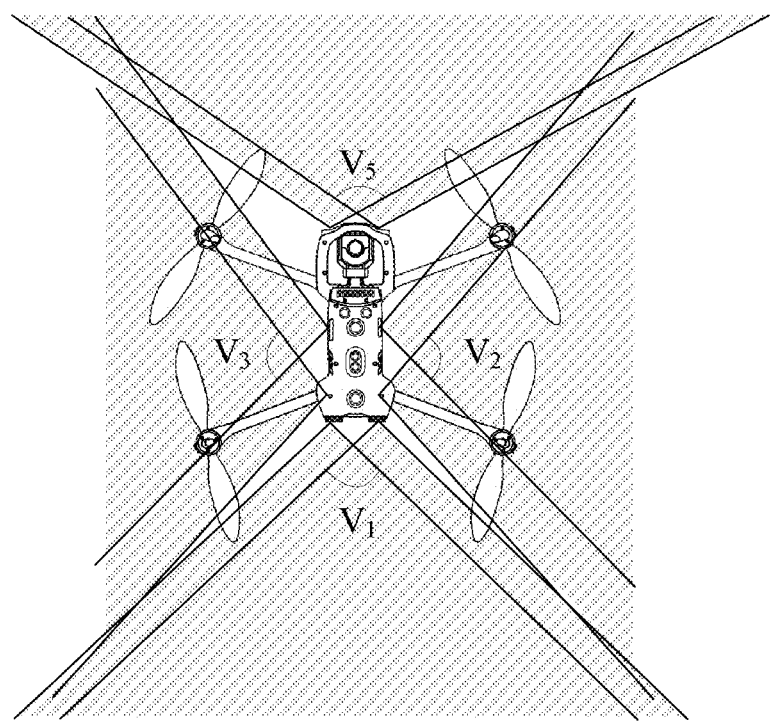
FIG. 9 is a schematic diagram of a binocular sensing area of an unmanned aerial vehicle at another viewing angle provided by an embodiment of the disclosure.

As shown in FIG. 9, on the top (bottom) view of the unmanned aerial vehicle 10, in order to ensure the omni-directional coverage of the binocular sensing area (shaded portion), a horizontal viewing angle $V_1$ of the first binocular, a horizontal viewing angle $V_2$ of the second binocular camera, a horizontal viewing angle $V_3$ of the third binocular camera and a horizontal viewing angle $V_5$ of the fifth binocular satisfy: $V_1+V_2+V_3+V_5>360°$; and the horizontal viewing angle of the first binocular camera partially overlaps the horizontal viewing angle of the second binocular camera, the horizontal viewing angle of the second binocular camera partially overlaps the horizontal viewing angle of the fifth binocular camera, the horizontal viewing angle of the fifth binocular camera partially overlaps the horizontal viewing angle of the third binocular camera, and the horizontal viewing angle of the third binocular camera partially overlaps the horizontal viewing angle of the first binocular camera.

Further, the horizontal viewing angle $V_1$ of the first binocular, the horizontal viewing angle $V_2$ of the second binocular camera, the horizontal viewing angle $V_3$ of the third binocular camera and the horizontal viewing angle $V_5$ of the fifth binocular further satisfy the following conditions:

$V_1+V_2>180°$;
$V_2+V_5>180°$;
$V_5+V_3>180°$;
$V_3+V_1>180°$.

Figure 10:
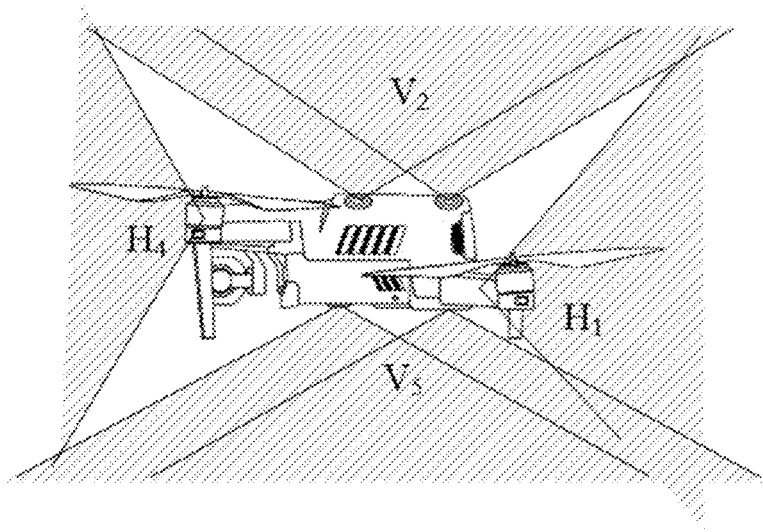
FIG. 10 is a schematic diagram of a binocular sensing area of an unmanned aerial vehicle at yet another viewing angle provided by an embodiment of the disclosure.

As shown in FIG. 10, on the left view of the unmanned aerial vehicle 10, in order to ensure the omni-directional coverage of the binocular sensing area (shaded portion), the vertical viewing angle $H_1$ of the first binocular, the horizontal viewing angle $V_2$ of the second binocular, the vertical viewing angle $H_4$ of the fourth binocular and the horizontal viewing angle $V_5$ of the fifth binocular satisfy: $H_1+V_2+H_4+V_5>360°$; and the vertical viewing angle of the first binocular partially overlaps the horizontal viewing angle of the second binocular, the horizontal viewing angle of the second binocular partially overlaps the vertical viewing angle of the fourth binocular, and the vertical viewing angle of the fourth binocular partially overlaps the horizontal viewing angle of the fifth binocular.

Further, the vertical viewing angle $H_1$ of the first binocular, the horizontal viewing angle $V_2$ of the second binocular, the vertical viewing angle $H_4$ of the fourth binocular and the horizontal viewing angle $V_5$ of the fifth binocular further satisfy the following conditions:

$H_1+V_2>180°$;
$V_2+H_4>180°$;
$H_4+V_5>180°$;
$V_5+H_1>180°$.

On the right view of the unmanned aerial vehicle 10, likewise, in order to ensure the omni-directional coverage of the binocular sensing area (shaded portion), the vertical viewing angle of the first binocular, the horizontal viewing angle of the third binocular, the vertical viewing angle of the fourth binocular and the horizontal viewing angle of the fifth binocular should also satisfy the above-mentioned constraint conditions.

The unmanned aerial vehicle 10 of the embodiment of the disclosure can realize the omni-directional coverage of the binocular sensing area by setting the specific mounting of each binocular camera and defining the relationship between the horizontal viewing angle and the vertical viewing angle of each binocular camera.

Embodiment 4

Figure 11:
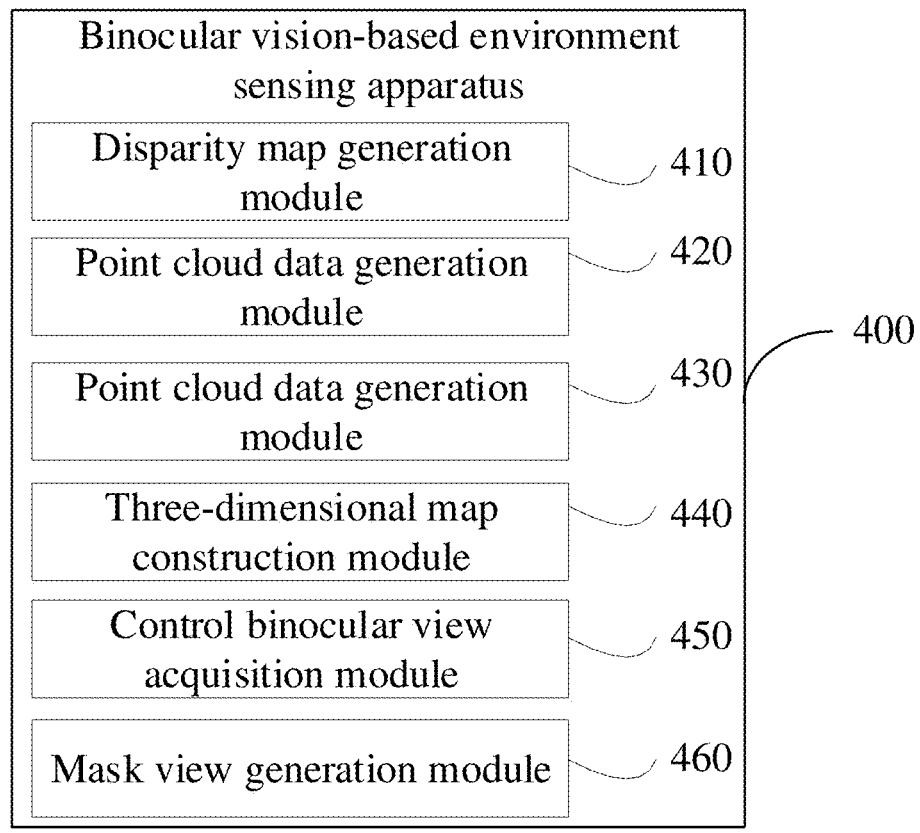
FIG. 11 is a schematic diagram of a binocular vision-based environment sensing apparatus provided by an embodiment of the disclosure.

FIG. 11 is a schematic diagram of a binocular vision-based environment sensing apparatus 400 provided by an embodiment of the disclosure. The apparatus 400 is applied to an unmanned aerial vehicle 10 as described above.

The apparatus 400 includes:
a disparity map generation module 410 for acquiring a binocular view by using each binocular camera among the five binocular cameras, and generating disparity maps according to the binocular views;
an initial point cloud data generation module 420 for separately generating initial three-dimensional (3D) point cloud data according to the disparity maps and internal parameters of the binocular cameras corresponding thereto;
a point cloud data generation module 430 for converting coordinate systems of the initial 3D point cloud data into world coordinate systems, respectively, so as to acquire 3D point cloud data in five world coordinate systems;
a three-dimensional map construction module 440 for constructing a 3D map of a target scene according to the 3D point cloud data in the five world coordinate systems.

In another implementation, the apparatus 400 further includes:
a control binocular view acquisition module 450 for, in a pre-set environment, acquiring a control binocular view by using each binocular camera among the five binocular cameras;
a mask view generation module 460 for, if it is determined that there is an occlusion area formed by a body of the unmanned aerial vehicle 10 on left and right views in the control binocular view, respectively constructing a left mask and a right mask according to the occlusion area, generating mask views corresponding to the binocular camera according to the left mask and the right mask, and storing the mask views;
the initial point cloud data generation module 420 further for fusing the disparity map and a mask view corresponding to the binocular camera to generate a fused disparity map; generating initial three-dimensional point cloud data according to the fused disparity map and the internal parameters of the binocular camera.

It should be noted that in Embodiment 4 of the disclosure, the apparatus 400 can respectively perform the binocular vision-based environment sensing method provided in Embodiment 1 and Embodiment 2 of the disclosure, with corresponding functional modules and advantageous effects for performing the method. For the technical details not described in detail in the embodiment of the apparatus, reference can be made to the binocular vision-based environment sensing method provided in Embodiments 1 and 2 of the disclosure. For structural details not described in detail in the embodiment, reference can be made to the structure of the unmanned aerial vehicle 10 provided in Embodiment 3 of the disclosure.

Embodiment 5

Figure 12:
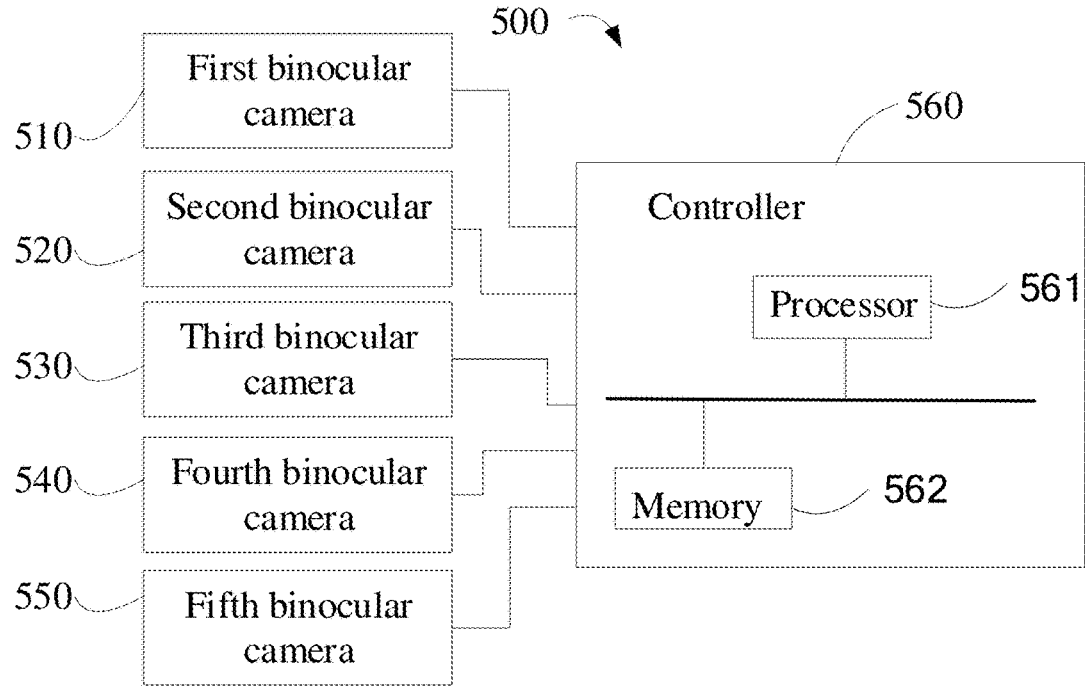
FIG. 12 is a schematic structural diagram of an unmanned aerial vehicle provided by an embodiment of the disclosure.

FIG. 12 is an unmanned aerial vehicle 500 provided by an embodiment of the disclosure, and the unmanned aerial vehicle 500 includes:
a first binocular camera 510 disposed at a front portion of a fuselage 110 of the unmanned aerial vehicle 500;
a second binocular camera 520 inclined upward and disposed between a left side of the fuselage and an upper portion of the fuselage 110 of the unmanned aerial vehicle 500;
a third binocular camera 530 inclined upward and disposed between a right side of the fuselage and the upper portion of the fuselage 110 of the unmanned aerial vehicle 500;
a fourth binocular camera 540 disposed at a lower portion of the fuselage 110 of the unmanned aerial vehicle 500;
a fifth binocular camera 550 disposed at a rear portion of the fuselage 110 of the unmanned aerial vehicle 500;
a controller 560 respectively connected to the first binocular camera 510, the second binocular camera 520, the third binocular camera 530, the fourth binocular camera 540 and the fifth binocular camera 550, the controller 560 including:
at least one processor 561 and a memory 562 communicatively connected to the at least one processor 561, as exemplified by one processor 561 in FIG. 12.

The processor 561 and the memory 562 may be connected via a bus or otherwise, as exemplified by the connection via a bus in FIG. 12.

The memory 562, as a nonvolatile computer-readable storage medium, can be used for storing a nonvolatile software program, a nonvolatile computer executable program, and modules, such as program instructions/modules corresponding to a binocular vision-based environment sensing method in an embodiment of the disclosure (e.g. the disparity map generation module 410, the initial point cloud data generation module 420, the point cloud data generation module 430, the three-dimensional map construction module 440, the control binocular view acquisition module 450, and the mask view generation module 460 shown in FIG. 11). The processor 561 implements the binocular vision-based environment sensing method of the described method embodiments by running nonvolatile software programs, instructions, and modules stored in the memory 562.

The memory 562 may include a program storage area and a data storage area, wherein the program storage area may store an operating system and an application program required by at least one function; the data storage area may store data created according to the use of the head, etc. In addition, the memory 562 may include high speed random access memory and may also include nonvolatile memory, such as at least one magnetic disk storage device, flash memory device, or other nonvolatile solid state storage devices. In some embodiments, the memory 562 may optionally include memory remotely disposed with respect to the processor 561, which may be connected to the head via a network. Embodiments of the networks include, but are not limited to, the Internet, intranets, local area networks, mobile communication networks, and combinations thereof.

The one or more modules are stored in the memory 562 and, when executed by the one or more processors 561, perform the binocular vision-based environment sensing method, e.g., perform the method steps of FIGS. 4 and 5 described above, to implement the functions of the modules of FIG. 11.

The unmanned aerial vehicle 500 can perform the binocular vision-based environment sensing method provided by the embodiment of the disclosure, with corresponding functional modules and advantageous effects for performing the method. For the technical details not described in detail in the embodiment, reference can be made to the binocular vision-based environment sensing method provided by the embodiment of the disclosure. For structural details not described in detail in the embodiment, reference can be made to the structure of the unmanned aerial vehicle 10 provided in Embodiment 3 of the disclosure.

Embodiment 6

Figure 13:
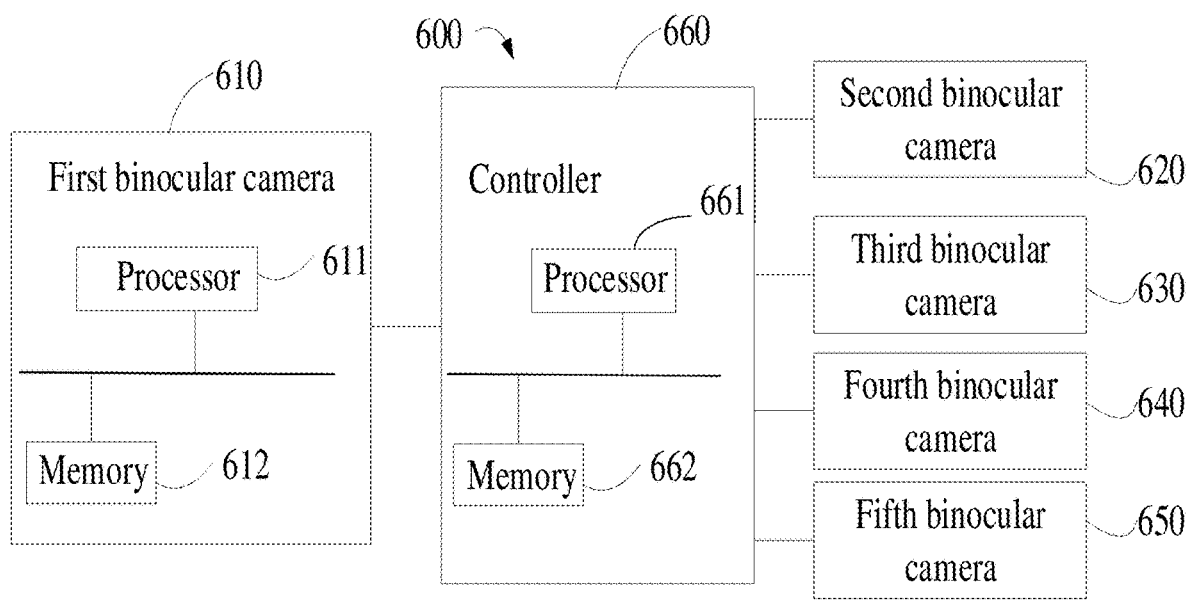
FIG. 13 is a schematic structural diagram of an unmanned aerial vehicle provided by another embodiment of the disclosure.

FIG. 13 is an unmanned aerial vehicle 600 provided by another embodiment of the disclosure, and the unmanned aerial vehicle 600 includes:

a first binocular camera 610 disposed at a front portion of a fuselage 110 of the unmanned aerial vehicle 600;

a second binocular camera 620 inclined upward and disposed between a left side of the fuselage 110 and an upper portion of the fuselage 110 of the unmanned aerial vehicle 600;

a third binocular camera 630 inclined upward and disposed between a right side of the fuselage 110 and the upper portion of the fuselage 110 of the unmanned aerial vehicle 600;

a fourth binocular camera 640 disposed at a lower portion of the fuselage 110 of the unmanned aerial vehicle 600;

a fifth binocular camera 650 disposed at a rear portion of the fuselage 110 of the unmanned aerial vehicle 600;

a controller 660 respectively connected to the first binocular camera 610, the second binocular camera 620, the third binocular camera 630, the fourth binocular camera 640, and the fifth binocular camera 650.

Wherein the first binocular camera 610, the second binocular camera 620, the third binocular camera 630, the fourth binocular camera 640 and the fifth binocular camera 650 all include:

at least one processor 611 and a memory 612 communicatively connected to the at least one processor 611, as exemplified by the first binocular camera 610 and one processor 611 in FIG. 13.

The processor 611 and the memory 612 may be connected via a bus or otherwise, as exemplified by the connection via a bus in FIG. 13.

The memory 612, as a nonvolatile computer-readable storage medium, can be used for storing a nonvolatile software program, a nonvolatile computer executable program, and modules, such as the disparity map generation module 410, the initial point cloud data generation module 420, the point cloud data generation module 430, the control binocular view acquisition module 450, and the mask view generation module 460 shown in FIG. 11 in the embodiment of the disclosure. The processor 611 performs the following method steps by running nonvolatile software programs, instructions, and modules stored in the memory 612:

acquiring a binocular view, and generating disparity maps according to the binocular views;

generating initial three-dimensional point cloud data according to the disparity maps and internal parameters;

and converting coordinate systems of the initial 3D point cloud data into world coordinate systems, so as to acquire 3D point cloud data in world coordinate systems.

In another embodiment, the processor 611 also performs the following method steps by running nonvolatile software programs, instructions, and modules stored in the memory 612:

in a pre-set environment, acquiring a control binocular view;

if it is determined that there is an occlusion area formed by a body of the unmanned aerial vehicle 600 on left and right views in the control binocular view, respectively constructing a left mask and a right mask according to the occlusion area, generating mask views corresponding to the binocular camera according to the left mask and the right mask, and storing the mask views;

fusing the disparity map and a mask view corresponding to the binocular camera to generate a fused disparity map;

generating initial three-dimensional point cloud data according to the fused disparity map and the internal parameters of the binocular camera.

The controller 660 includes:

at least one processor 661 and a memory 662 communicatively connected to the at least one processor 661, as exemplified by one processor 661 in FIG. 13.

The processor 661 and the memory 662 may be connected via a bus or otherwise, as exemplified by the connection via a bus in FIG. 13.

The memory 662, as a nonvolatile computer-readable storage medium, can be used for storing a nonvolatile software program, a nonvolatile computer executable program, and modules, such as the three-dimensional map construction module 440 shown in FIG. 11 in the embodiment of the disclosure. The processor 661 performs the following method steps by running nonvolatile software programs, instructions, and modules stored in the memory 662:

constructing a 3D map of a target scene according to the 3D point cloud data of the first binocular camera 610, the second binocular camera 620, the third binocular camera 630, the fourth binocular camera 640, and the fifth binocular camera 650.

Further, the specific structure of the memory 612, the memory 662, and the specific setting of the memory 612 and the processor 611, and the specific setting of the memory 662 and the processor 661 described above may be referred to the specific structure of the memory 562, and the specific setting of the memory 562 and the processor 561 in Embodiment 5 and will not be described in detail.

It should be noted that the embodiments of the apparatus described above are merely schematic, wherein the modules illustrated as separate components may or may not be physically separated, and the components shown as modules may or may not be physical modules, i.e. may be located in one place, or may also be distributed over a plurality of network modules. Some or all of the modules may be selected to achieve the objects of the embodiment scheme according to actual needs.

From the above description of the embodiments, it will be clear to a person skilled in the art that the embodiments may be implemented by means of software and a general purpose hardware platform, but also by means of hardware. It will be appreciated by those of ordinary skill in the art that implementing all or part of the flow of the methods of the described embodiments can be accomplished by hardware associated with computer program instructions, which can be stored on a computer-readable storage medium, which when executed, can include the flow of the embodiments of the methods as described. Wherein, the storage medium may be a Read-Only Memory (ROM) or a Random Access Memory (RAM), etc.

Finally, it should be noted that the foregoing embodiments are merely intended for describing the technical solutions of the disclosure rather than limiting the disclosure. Under the ideas of the disclosure, the technical features in the foregoing embodiments or different embodiments may also be combined, the steps may be performed in any order, many other changes of different aspects of the disclosure also exist as described above, and these changes are not provided in detail for simplicity. Although the disclosure is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not make the essence of corresponding technical solutions depart from the scope of the technical solutions of the embodiments of the disclosure.

The invention claimed is:

1. A binocular vision-based environment sensing method, applied to an unmanned aerial vehicle provided with five binocular cameras, the five binocular cameras comprising a first binocular camera, a second binocular camera, a third binocular camera, a fourth binocular camera and a fifth binocular camera, the first binocular camera being disposed at a front portion of a fuselage of the unmanned aerial vehicle, the second binocular camera being inclined upward and being disposed between a left side of the fuselage and an upper portion of the fuselage of the unmanned aerial vehicle, the third binocular camera being inclined upward and being disposed between a right side of the fuselage and the upper portion of the fuselage of the unmanned aerial vehicle, the fourth binocular camera being disposed at a lower portion of the fuselage of the unmanned aerial vehicle, and the fifth binocular camera being disposed at a rear portion of the fuselage of the unmanned aerial vehicle;

the method comprising:
acquiring a binocular view by using each binocular camera among the five binocular cameras, and generating disparity maps according to the binocular views;
separately generating initial three-dimensional (3D) point cloud data according to the disparity maps and internal parameters of the binocular cameras corresponding thereto;
converting coordinate systems of the initial 3D point cloud data into world coordinate systems, respectively, so as to acquire 3D point cloud data in five world coordinate systems;
constructing a 3D map of a target scene according to the 3D point cloud data in the five world coordinate systems;
acquiring a control binocular view in a pre-set environment by using each binocular camera among the five binocular cameras;
determining whether there is an occlusion area formed by a body of the unmanned aerial vehicle on left and right views in the control binocular view;
when it is determined that there is an occlusion area formed by a body of the unmanned aerial vehicle on left and right views in the control binocular view, respectively constructing a left mask and a right mask according to the occlusion area, generating mask views corresponding to the binocular camera according to the left mask and the right mask, and storing the mask views;
fusing the disparity map and a mask view corresponding to the binocular camera to generate a fused disparity map; and
generating initial three-dimensional point cloud data according to the fused disparity map and the internal parameters of the binocular camera.

2. The method according to claim 1, wherein an optical center line of any binocular camera is parallel to a horizontal plane, and two optical axes of any binocular camera are parallel to each other.

3. The method according to claim 2, wherein an optical axis of the second binocular camera and an optical axis of the third binocular camera each have an angle $\alpha$ to a horizontal plane.

4. The method according to claim 3, wherein a vertical viewing angle $H_2$ of the second binocular camera, a vertical viewing angle $H_3$ of the third binocular camera and a vertical viewing angle $H_4$ of the fourth binocular camera satisfy: $H_2+H_3+H_4>360°$; and
the vertical viewing angle of the second binocular camera partially overlaps the vertical viewing angle of the third binocular camera, the vertical viewing angle of the third binocular camera partially overlaps the vertical viewing angle of the fourth binocular camera, and the vertical viewing angle of the fourth binocular camera partially overlaps the vertical viewing angle of the second binocular camera.

5. The method according to claim 4, wherein the vertical viewing angle $H_2$ of the second binocular camera, the vertical viewing angle $H_3$ of the third binocular camera and the vertical viewing angle $H_4$ of the fourth binocular camera further satisfy the following conditions:
$H_2+H_4-2\alpha>180°$;
$H_3+H_4-2\alpha>180°$;
$H_2+H_3>180°$.

6. The method according to claim 3, wherein a horizontal viewing angle $V_1$ of the first binocular, a horizontal viewing angle $V_2$ of the second binocular camera, a horizontal viewing angle $V_3$ of the third binocular camera and a horizontal viewing angle $V_5$ of the fifth binocular satisfy: $V_1+V_2+V_3+V_5>360°$; and
the horizontal viewing angle of the first binocular camera partially overlaps the horizontal viewing angle of the second binocular camera, the horizontal viewing angle of the second binocular camera partially overlaps the horizontal viewing angle of the fifth binocular camera, the horizontal viewing angle of the fifth binocular camera partially overlaps the horizontal viewing angle of the third binocular camera, and the horizontal viewing angle of the third binocular camera partially overlaps the horizontal viewing angle of the first binocular camera.

7. The method according to claim 6, wherein the horizontal viewing angle $V_1$ of the first binocular, the horizontal viewing angle $V_2$ of the second binocular camera, the horizontal viewing angle $V_3$ of the third binocular camera and the horizontal viewing angle $V_5$ of the fifth binocular further satisfy the following conditions:

$V_1+V_2>180°$;
$V_2+V_5>180°$;
$V_5+V_3>180°$;
$V_3+V_1>180°$.

8. The method according to claim 3, wherein the vertical viewing angle $H_1$ of the first binocular, the horizontal viewing angle $V_2$ of the second binocular, the vertical viewing angle $H_4$ of the fourth binocular and the horizontal viewing angle $V_5$ of the fifth binocular satisfy: $H_1+V_2+H_4+V_5>360°$; and the vertical viewing angle of the first binocular partially overlaps the horizontal viewing angle of the second binocular, the horizontal viewing angle of the second binocular partially overlaps the vertical viewing angle of the fourth binocular, and the vertical viewing angle of the fourth binocular partially overlaps the horizontal viewing angle of the fifth binocular.

9. The method according to claim 8, wherein the vertical viewing angle $H_1$ of the first binocular, the horizontal viewing angle $V_2$ of the second binocular, the vertical viewing angle $H_4$ of the fourth binocular and the horizontal viewing angle $V_5$ of the fifth binocular further satisfy the following conditions:

$H_1+V_2>180°$;
$V_2+H_4>180°$;
$H_4+V_5>180°$;
$V_5+H_1>180°$.

10. The method according to claim 9, wherein the horizontal viewing angle of the third binocular is equal to the horizontal viewing angle of the second binocular.

11. The method according to claim 1, wherein before the acquiring a binocular view by using each binocular camera among the five binocular cameras, and generating disparity maps according to the binocular views, the method further comprises:

in a pre-set environment, acquiring a control binocular view by using each binocular camera among the five binocular cameras;

determining whether there is an occlusion area formed by a body of the unmanned aerial vehicle on left and right views in the control binocular view;

when it is determined that there is an occlusion area formed by a body of the unmanned aerial vehicle on left and right views in the control binocular view, respectively constructing a left mask and a right mask according to the occlusion area, generating mask views corresponding to the binocular camera according to the left mask and the right mask, and storing the mask views;

then the generating initial three-dimensional point cloud data according to the disparity maps and internal parameters of the binocular cameras corresponding thereto, specifically comprising:

fusing the disparity map and a mask view corresponding to the binocular camera to generate a fused disparity map;

generating initial three-dimensional point cloud data according to the fused disparity map and the internal parameters of the binocular camera.

12. The method according to claim 11, wherein the occlusion area formed by the body of the unmanned aerial vehicle comprises at least one of:

an occlusion area formed by an arm of the unmanned aerial vehicle, an occlusion area formed by a fuselage of the unmanned aerial vehicle, an occlusion area formed by a power apparatus of the unmanned aerial vehicle, and an occlusion area formed by a protection apparatus of the unmanned aerial vehicle.

13. A binocular vision-based environment sensing apparatus, applied to an unmanned aerial vehicle provided with five binocular cameras, the five binocular cameras comprising a first binocular camera, a second binocular camera, a third binocular camera, a fourth binocular camera and a fifth binocular camera, the first binocular camera being disposed at a front portion of a fuselage of the unmanned aerial vehicle, the second binocular camera being inclined upward and being disposed between a left side of the fuselage and an upper portion of the fuselage of the unmanned aerial vehicle, the third binocular camera being inclined upward and being disposed between a right side of the fuselage and the upper portion of the fuselage of the unmanned aerial vehicle, the fourth binocular camera being disposed at a lower portion of the fuselage of the unmanned aerial vehicle, and the fifth binocular camera being disposed at a rear portion of the fuselage of the unmanned aerial vehicle, the apparatus comprising:

a disparity map generation module for acquiring a binocular view by using each binocular camera among the five binocular cameras, and generating disparity maps according to the binocular views;

an initial point cloud data generation module for separately generating initial three-dimensional (3D) point cloud data according to the disparity maps and internal parameters of the binocular cameras corresponding thereto;

a point cloud data generation module for converting coordinate systems of the initial 3D point cloud data into world coordinate systems, respectively, so as to acquire 3D point cloud data in five world coordinate systems;

a three-dimensional map construction module for constructing a 3D map of a target scene according to the 3D point cloud data in the five world coordinate systems a control binocular view acquisition module for, in a pre-set environment, acquiring a control binocular view by using each binocular camera among the five binocular cameras; and a mask view generation module for, if it is determined that there is an occlusion area formed by a body of the unmanned aerial vehicle on left and right views in the control binocular view, respectively constructing a left mask and a right mask according to the occlusion area, generating mask views corresponding to the binocular camera according to the left mask and the right mask, and storing the mask views;

the initial point cloud data generation module further for fusing the disparity map and a mask view corresponding to the binocular camera to generate a fused disparity map;

generating initial three-dimensional point cloud data according to the fused disparity map and the internal parameters of the binocular camera.

14. An unmanned aerial vehicle, comprising:

a first binocular camera disposed at a front portion of a fuselage of the unmanned aerial vehicle;

a second binocular camera inclined upward and disposed between a left side of the fuselage and an upper portion of the fuselage of the unmanned aerial vehicle;

a third binocular camera inclined upward and disposed between a right side of the fuselage and the upper portion of the fuselage of the unmanned aerial vehicle;

a fourth binocular camera disposed at a lower portion of the fuselage of the unmanned aerial vehicle;

a fifth binocular camera disposed at a rear portion of the fuselage of the unmanned aerial vehicle;

a controller respectively connected to the first binocular camera, the second binocular camera, the third binocular camera, the fourth binocular camera and the fifth binocular camera, the controller comprising: at least one processor, and a memory communicatively connected to the at least one processor, the memory storing instructions executable by the at least one processor, the instructions being executable by the at least one processor to enable the at least one processor to perform the following operations:

acquiring a binocular view by using each binocular camera among the five binocular cameras, and generating disparity maps according to the binocular views;

separately generating initial three-dimensional (3D) point cloud data according to the disparity maps and internal parameters of the binocular cameras corresponding thereto;

converting coordinate systems of the initial 3D point cloud data into world coordinate systems, respectively, so as to acquire 3D point cloud data in five world coordinate systems;

constructing a 3D map of a target scene according to the 3D point cloud data in the five world coordinate systems wherein the at least one processor further performs the following operations:

acquiring a control binocular view in a pre-set environment by using each binocular camera among the five binocular cameras;

if there is an occlusion area formed by a body of the unmanned aerial vehicle on left and right views in the control binocular view, respectively constructing a left mask and a right mask according to the occlusion area, generating mask views corresponding to the binocular camera according to the left mask and the right mask, and storing the mask views;

fusing the disparity map and a mask view corresponding to the binocular camera to generate a fused disparity map; and generating initial three-dimensional point cloud data according to the fused disparity map and the internal parameters of the binocular camera.

15. The unmanned aerial vehicle according to claim 14, wherein an optical center line of any binocular camera is parallel to a horizontal plane, and two optical axes of any binocular camera are parallel to each other; and an optical axis of the second binocular camera and an optical axis of the third binocular camera each have an angle $\alpha$ to a horizontal plane.

16. The unmanned aerial vehicle according to claim 15, wherein a vertical viewing angle $H_2$ of the second binocular camera, a vertical viewing angle $H_3$ of the third binocular camera and a vertical viewing angle $H_4$ of the fourth binocular camera satisfy: $H_2+H_3+H_{4>360}°$; and the vertical viewing angle of the second binocular camera partially overlaps the vertical viewing angle of the third binocular camera, the vertical viewing angle of the third binocular camera partially overlaps the vertical viewing angle of the fourth binocular camera, and the vertical viewing angle of the fourth binocular camera partially overlaps the vertical viewing angle of the second binocular camera.

17. The unmanned aerial vehicle according to claim 16, wherein the vertical viewing angle $H_2$ of the second binocular camera, the vertical viewing angle $H_3$ of the third binocular camera and the vertical viewing angle $H_4$ of the fourth binocular camera further satisfy the following conditions:

$H_2+H_4-2\alpha>180°$;
$H_3+H_4-2\alpha>180°$;
$H_2+H_3>180°$.

18. The unmanned aerial vehicle according to claim 15, wherein a horizontal viewing angle $V_1$ of the first binocular, a horizontal viewing angle $V_2$ of the second binocular camera, a horizontal viewing angle $V_3$ of the third binocular camera and a horizontal viewing angle $V_5$ of the fifth binocular satisfy: $V_1+V_2+V_3+V_5>360°$; and the horizontal viewing angle of the first binocular camera partially overlaps the horizontal viewing angle of the second binocular camera, the horizontal viewing angle of the second binocular camera partially overlaps the horizontal viewing angle of the fifth binocular camera, the horizontal viewing angle of the fifth binocular camera partially overlaps the horizontal viewing angle of the third binocular camera, and the horizontal viewing angle of the third binocular camera partially overlaps the horizontal viewing angle of the first binocular camera.

* * * * *